Jan. 18, 1944.  H. T. LANGABEER  2,339,490
POWER SUPPLY SYSTEM
Filed Aug. 1, 1942  4 Sheets-Sheet 1

FIG.1.

INVENTOR
*H.T.LANGABEER*
BY
ATTORNEY

Jan. 18, 1944.    H. T. LANGABEER    2,339,490
POWER SUPPLY SYSTEM
Filed Aug. 1, 1942    4 Sheets-Sheet 2

INVENTOR
H.T. LANGABEER
BY
*A. F. Kane*
ATTORNEY

Patented Jan. 18, 1944

2,339,490

UNITED STATES PATENT OFFICE 2,339,490

POWER SUPPLY SYSTEM

Harvey T. Langabeer, Baldwin, N. Y., assignor to Bell Telephone Laboratories, Incorporated, New York, N. Y., a corporation of New York Application August 1, 1942, Serial No. 453,232

9 Claims. (Cl. 171—118)

This invention relates to power supply systems and particularly to such systems wherein a direct current load circuit is supplied from an alternating current source through the medium of a rectifier, and in which facilities are provided for adequately supplying the load when the load requirements exceed the output capacity of the rectifier.

In systems of this general character it has been common practice to provide a plurality of equally rated rectifiers, or motor generator sets as the means for supplying a direct current load with power from an alternating current source. Such systems are so designed that when the load being supplied by the rectifier, or by the motor generator set exceeds the rated output of the supply device, a second rectifier, or motor generator set is automatically connected in parallel with the first power supply device so that both devices function collectively to furnish the load. In some circumstances it is found undesirable, or impracticable to locate a plurality of equally rated rectifiers, or motor generators at a power station and to operate them in parallel when load conditions are such as to warrant such operation.

The objects of this invention are to simplify and improve the operation of a power plant which functions to supply a variable direct current load from an alternating current source through the medium of a rectifier having a predetermined output rating, and which provides facilities for substituting for the rectifier an auxiliary source of direct current when the output rating of the rectifier is exceeded by the load.

These objects are attained in accordance with a feature of the invention by supplying a variable direct current load from an alternating current source of power through the medium of a rectifier whose rated output is such as to adequately provide for the load under normal conditions, and by substituting a separate source of direct current, in the nature of a motor generator set having an output capacity greater than that of the rectifier for the latter when the load exceeds the rated output of the rectifier.

Another feature of the invention resides in means for automatically stopping the motor generator set and restarting the rectifier when the load decreases to a value within the rated output of the rectifier.

A further feature of the invention provides for starting and stopping a rectifier, or motor generator set under control of load and battery voltage.

These and other features of the invention will be readily understood from the following detailed description made with reference to the accompanying drawings in which the several Figs. 1, 2, 3 and 4, when assembled in the manner shown in Fig. 5 constitute a diagrammatic representation of a power plant employing a full wave rectifier (Fig. 1) and a motor-driven generator (Fig. 4) as the means for transferring energy from an alternating current source 15 to a direct current load indicated at 389 in Fig. 3, across which a storage battery B is floated. The load and battery are illustrated at the lower right of Fig. 3, the lower intermediate portion of which figure shows a voltage regulating circuit which responds to variations in the voltage of the storage battery to cause corresponding adjustments of the output of the rectifier of Fig. 1, or of the motor generator set of Fig. 4, depending upon which device is in operation at the time the adjustments are required.

Before entering into a detailed description of the operation of the complete system illustrated, a brief description of the rectifier circuit shown in Fig. 1 and also of the regulator circuit shown in the lower portion of Fig. 3 will be made.

The transformer T2 supplies filament voltage to the rectifier tubes V1 and V2 when the contactor relay 26 operates to connect the rectifier to the alternating current source 15. The direct current output is measured by an ammeter relay AR which indicates the current and also acts as a relay. The rectifier output current is controlled by changing the plate voltage applied to the tubes.

The plate voltage applied to the tubes V1 and V2 is changed by means of a booster control equipment consisting of a motor-driven, continuously tapped autotransformer TR and an insulating booster transformer T3 which functions to raise the primary of the plate transformer T1 above the line voltage. The variable transformer TR operates in a manner similar to a motor-driven rheostat except instead of cutting in and out resistance, it cuts in and out the turns of an autotransformer. As the number of turns in use is increased or decreased, the voltage across the primary of transformer T3 is raised or lowered, respectively. Raising the voltage on the primary of transformer T3 causes a corresponding increase in the secondary voltage of this transformer. The secondary of transformer T3 is connected in series aiding with the primary of plate transformer T1, so that the transformer TR controls the output of the rectifier by raising or lowering the secondary voltage of plate transformer T1 which is the voltage applied to the plates of rectifier tubes V1 and V2.

The motor M associated with transformer TR is controlled by the operation of relays 10 and 11. When relay 10 operates, the motor M is rotated in a direction to move the contact arm 12 in a counter-clockwise direction to increase the voltage across the primary of transformer T3 which in turn increases the secondary voltage and thus raises the rectifier output. When relay 11 is operated, the motor contact arm 12 is rotated in the reverse direction to decrease the number of turns in series with the primary of transformer T3 and thus lower the rectifier output.

The motor M is an alternating current capacitor type which is operated on single phase current by means of a condenser 14 connected in parallel with one winding. By transferring the condenser from one winding to the other, the direction of rotation of the motor is reversed. Relays 10 and 11 function to switch condenser 14 from one motor winding to the other and also to connect the motor to the line L'.

Figure 1:
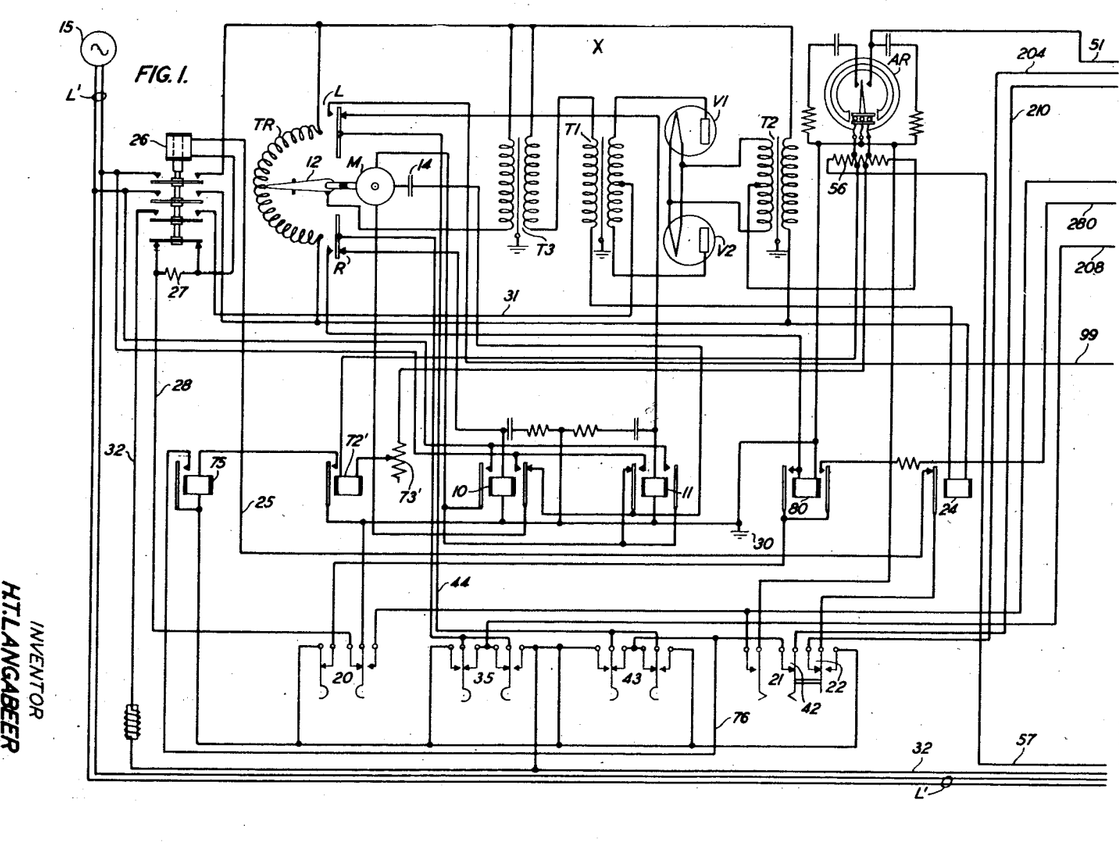
Figure 2:
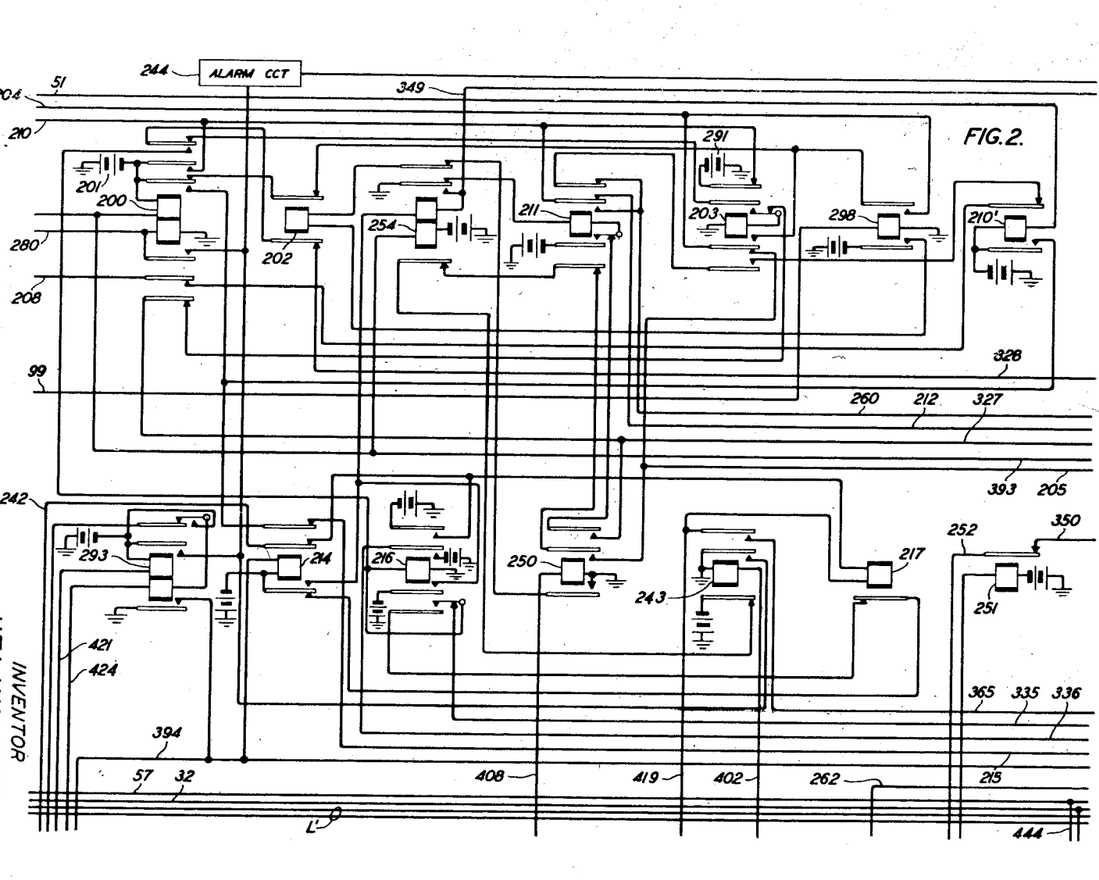
Fig. 2 and the upper portion of Fig. 3 show the control relay circuits which function as the controls for the rectifier and for the motor generator set.
Figure 3:
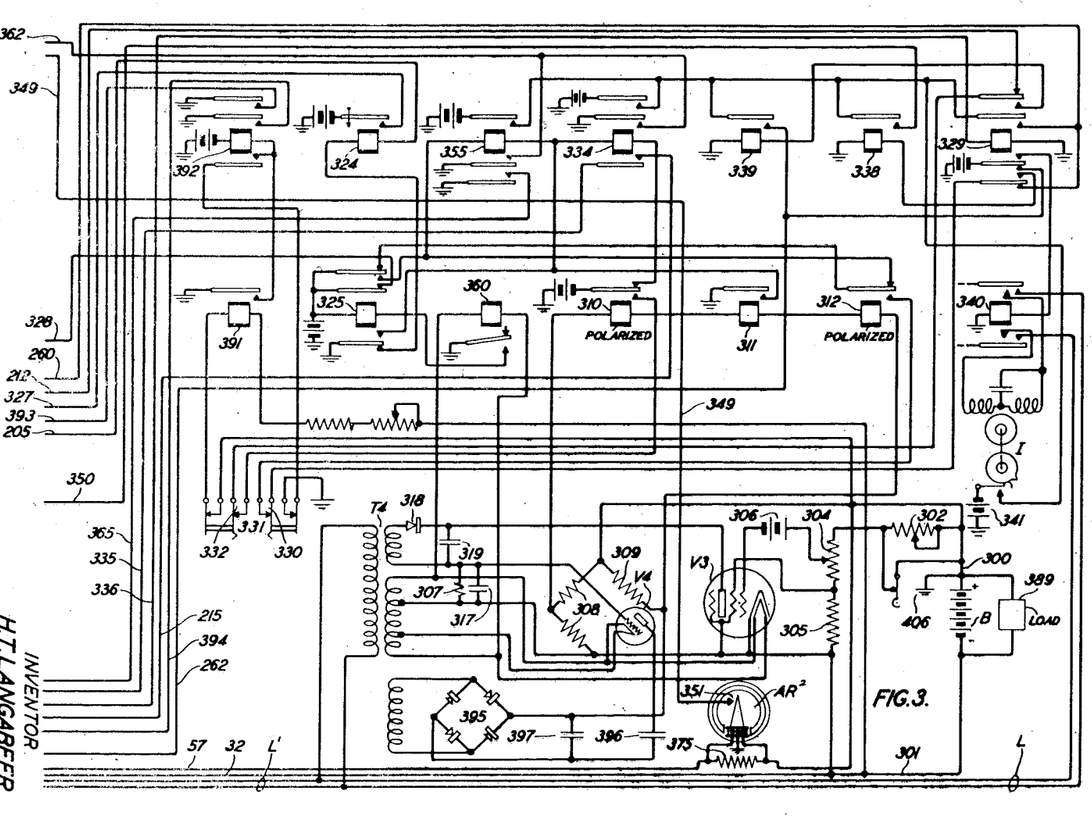
Figures 4, 5:
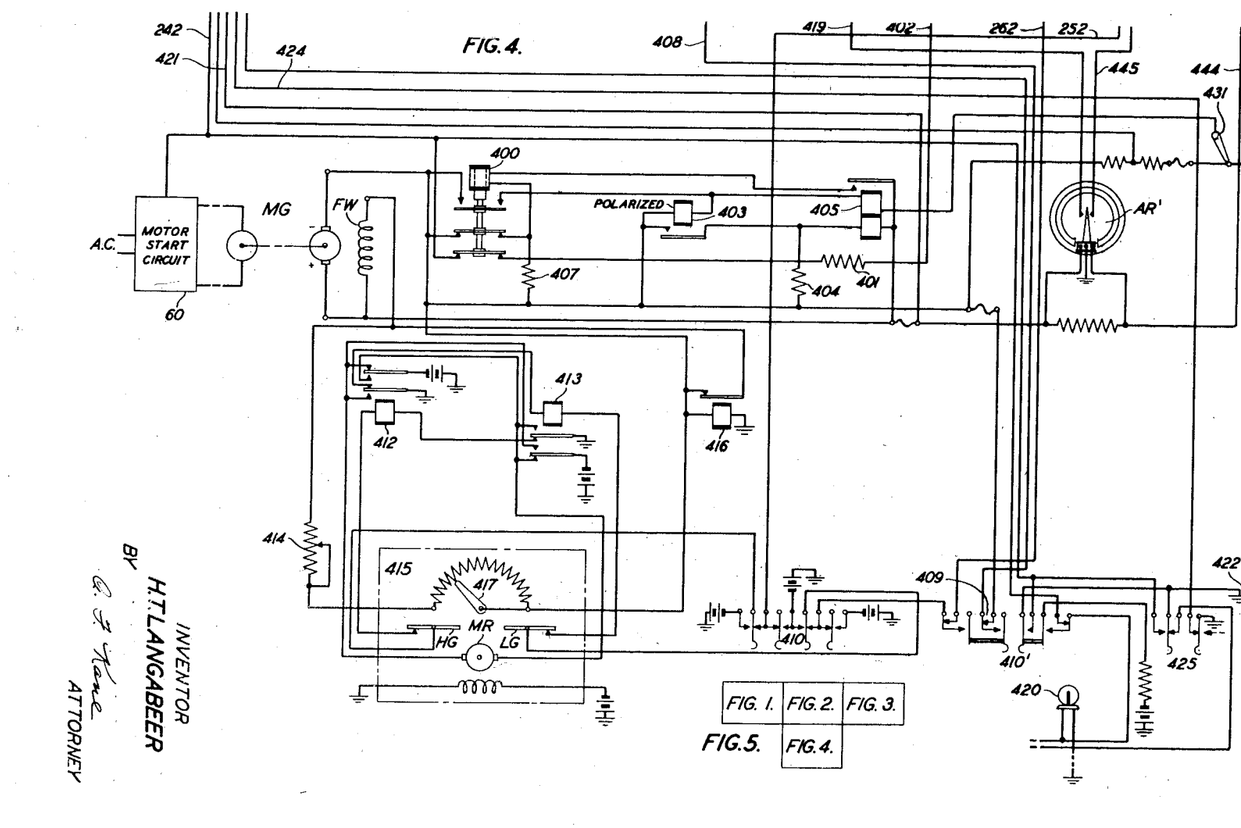

The voltage control equipment which occupies the lower portion of Fig. 3, serves to control the output of the rectifier X of Fig. 1 and also of the motor generator set of Fig. 2, and thus functions to maintain a constant battery voltage. The leads 300 and 301 connect the battery B to the regulating circuit. The charging rheostat 302, regulating rheostat 304 and resistance 305 form a potentiometer connected across the battery B. A positive potential, with respect to the cathode of amplifier tube V3 is taken off the potentiometer at the rheostat 304 and is opposed by a slightly higher grid battery 306, the difference in potential of approximately —1.25 volts being applied to the grid of vacuum tube V3. Variations in the battery voltage then reflect inversely to the grid of the amplifier tube V3. The small changes in grid voltage are amplified by V3 from a fraction of a volt to approximately seven volts. This amplifier output voltage appears as a voltage drop across resistance 307 which is applied to the grid of tube V4 in the regulator bridge circuit. The condenser 317 filters the amplified output voltage of amplifier V3 to prevent modulation of V4.

The varistor 318, condenser 319 and upper secondary winding of transformer T4 serve as a small half-wave rectifier to provide a direct current plate voltage for the amplifier tube V3. The plate voltage for tube T4 is derived from the rectifier 395 across whose output terminals are connected the condensers 396 and 397.

Vacuum tube V4 and resistances 308 and 309 form a bridge circuit, the plate-cathode resistance of tube V4 constituting one arm of the bridge. Relays 310, 311 and 312 are connected in series across the galvanometer corners of the bridge. The battery B is connected across the bridge by way of the leads 300 and 301. When the voltage of battery B is at the regulated value the voltage applied to the grid of tube V4 is a value which provides a plate-cathode resistance which balances the bridge. At such a time, no current flows through the windings of relays 310, 311 and 312. Relays 310 and 312 are polarized oppositely.

If the regulated voltage reduces below the floating range, this change in voltage is reflected through the potentiometers 302, 304 and 305 to the grids of tube V3, which amplifies the change but reduces the magnitude of the voltage applied to the grid of tube V4. This change in grid voltage unbalances the bridge in a direction to cause current to flow in the relay circuit in a direction to operate the polarized relay 312. Relay 310, however, does not operate since the current flow is opposite to its polarization. Relay 312 operates so as to cause relay 10 in the rectifier circuit to operate in a manner to be more fully described hereinafter. Relay 10 operated, as mentioned previously, causes the output current of the rectifier to be increased and thus to bring the battery voltage back into the floating range. When this takes place the regulator bridge is restored to balance and relay 312 releases.

If the regulated voltage should increase, this small change in voltage is reflected to the potentiometers 302, 304 and 305 and amplifier V3 in the same manner as described above, but in this case, the magnitude of the grid voltage of tube V4 is increased which causes an unbalance of the bridge in the opposite direction resulting in a reversal of the direction of current through the bridge relays and the consequent operation of relay 310. As will appear more fully hereinafter relay 310, operated, causes relay 11 in the rectifier circuit to function to reduce the rectifier output and thus to bring the battery voltage into the floating range.

If the voltage of battery B raises or lowers out of the floating range sufficiently to cause an unbalance in the bridge of approximately twice the magnitude required to operate relay 310 or relay 312, relay 311 will operate. The function performed by relay 311 will be described more fully hereinafter.

Having described the general operation of the rectifier and the voltage control circuits, the following description will be directed to the operation of the system as a whole, describing the manner in which the motor generator set is substituted for the rectifier in supplying the load when the load exceeds the rated output of the rectifier and also how the voltage control circuit functions to maintain the battery voltage substantially constant regardless of whether the load is being supplied by way of the rectifier or from the motor generator set.

*Rectifier X starts*

With the keys shown at the bottom of Fig. 1 in the positions illustrated, relay 293 operates in a circuit which may be traced from grounded battery 291, outer upper armature and back contact of relay 203, conductor 210, contacts 42 of key 21, normal contacts of key 43, conductor 44, left contact of limit switch L, conductor 99, winding of relay 298 to ground.

Slow-to-operate relay 324 (Fig. 3) now operates in a circuit extending from grounded battery 201, first upper armature and back contact of relay 200, upper armature and back contact of relay 202, upper armature and front contact of relay 298, conductor 204, contacts 22 of key 21, armature and back contact of relay 24, conductor 25, winding of contactor relay 26, lowermost contacts of contactor 26, conductor 28, right-hand normal contacts of key 29, to ground at 30. Relay 26 operates immediately in this circuit but relay 324 requires from three to five minutes to operate. The delay period of relay 324 allows the filaments of the tubes of rectifier X sufficient time to heat up to operating temperature before the regulation control is rendered effective to increase the rectifier output.

Contactor relay 26, operated, functions to connect the rectifier circuit to the alternating current source 15 by way of the line L'. This connection is completed by way of the two upper sets of contacts of relay 26. At its third outer set of contacts relay 26 closes the negative direct current charge lead. This lead, starting from the mid-point of the secondary of transformer T1 includes conductor 31, third outer contacts of relay 26, conductor 32, which by way of conductor 301 connects to the negative terminal of battery B (Fig. 3). At its outermost contacts, relay 26 effectively includes resistance 27 in series with its own winding. The positive charge lead may be traced from the positive terminal of battery B, conductor 300, ammeter shunt 375, conductor 57, ammeter shunt 56 to the mid-point of the secondary winding of transformer T2.

Regulation control connected to rectifier

When slow-to-operate relay 324 finally closes its contacts, a circuit is established which may be traced from grounded battery, armature and front contact of relay 324, conductor 327, outermost lower armature and back contact of relay 200, normal make-before-break contacts and winding of start relay 203 to ground.

Relay 203 operates in this circuit and locks in a circuit extending from grounded battery, inner upper armature and back contact of relay 325, conductor 328, back contact and lower armature of relay 202, outermost upper armature and back contact of relay 200, inner upper armature and front contact and winding of relay 203 to ground.

At the inner lower armature and back contact of relay 203 the operating circuit for relay 324 is opened causing this relay to release its armature and open the original operating circuit for relay 203. Relay 203, however, is now locked operated as described above. At its inner lower armature and front contact relay 203 shunts the upper armature and front contact of relay 298.

At its outer lower armature, relay 203 establishes the following circuit: ground at 30, winding of relay 10, right contact of limit switch R, normal contacts of key 35, conductor 208, middle lower armature and back contact of relay 200, upper armature and back contact of relay 210', front contact and outer lower armature of relay 203, outer upper armature and back contact of relay 211, conductor 260, back contact and outer lower armature of relay 329, contacts 330 of key 331, to the front contact of polarized relay 312 of the regulator bridge circuit.

Rectifier output increased

The voltage of battery B being low and outside the floating range, relay 312 of the regulator bridge circuit will be operated. The circuit just traced which includes the winding of relay 10 is now completed to grounded battery by way of the armature and front contact of relay 312 and the back contact and outer upper armature of relay 325. Relay 10 operates to cause motor M to function in such a manner as to cause the rheostat arm 12 to move in a counter-clockwise direction so as to increase the number of turns of TR connected across the supply to rectifier X and thereby increase the rectifier output. As the rectifier output is increased the battery voltage is brought into the floating range, the balanced condition of the bridge is attained and relay 312 is deenergized. Each time the load increases sufficiently to cause the battery voltage to decrease to its low voltage floating value, the above operation will be repeated to increase the rectifier output.

Rectifier output decreased

Should the load decrease and the voltage of battery B increase to its upper floating value, the regulator bridge will be unbalanced in the opposite direction and polarized relay 310 will operate. Relay 310, operated, completes a circuit extending from grounded battery, armature and front contact of relay 310, contacts 332 of key 331, outer upper armature and back contact of relay 329, conductor 212, back contact and inner upper armature of relay 211, conductor 210, contact 42 of key 21, normal closed contacts of key 43, conductor 44, right contact of limit switch L, winding of relay 11 to ground at 30. Relay 11 operates in this circuit and functions to decrease the output of rectifier X and to lower the voltage of battery B.

Transfer to motor generator

When the output of rectifier X increases to its full load ampere output rating, ammeter relay AR associated therewith operates to effect the closure of its right-hand contact. When this occurs, relay 210' operates in a circuit extending from grounded battery, winding of relay 210', conductor 51, right-hand contact and pointer of ammeter relay AR, to ground at 30. It will be noted that with relay 210' operated, no further increase of the rectifier output is obtained when relay 312 of the regulator bridge circuit operates in response to a decrease of the battery voltage to its low floating value. Normally, when relay 312 operates, relay 10 functions to increase the rectifier output as previously described. However, the operating circuit for relay 10 is now opened at the upper armature and back contact of relay 210'.

With a slight further decrease in the voltage of battery B, relay 311 of the regulator bridge circuit operates to complete an operating circuit for relay 334. This circuit extends from ground, armature and front contact of relay 311, winding of relay 334, back contact and armature of relay 310, to battery and ground. Relay 334, operated, completes an operating circuit for relay 216 extending from grounded battery, lower armature and front contact of relay 210', outer upper armature and back contact of relay 214, conductor 215, front contact and lower armature of relay 334, conductor 335, normal make-before-break contacts and winding of relay 216 to ground.

Relay 216 locks operated in a circuit extending from grounded battery, lower armature and back contact of relay 214, armature and back contact of relay 217, outer lower armature and front contact and winding of relay 216 to ground. At its inner upper armature relay 216 completes an operating circuit for relay 329 by way of conductor 336.

Relay 329 in operating its outer upper and lower armatures transfers the control leads of the regulator bridge circuit from the windings of relays 10 and 11 to relays 338 and 339 which, as will be described presently, function to regulate the output of the generator of the motor generator set MG.

At its inner lower armature and front contact relay 329 completes an obvious operating circuit for interrupter relay 340 which relay, when operated, connects the operating windings of the motor associated with interrupter I to the line L'. The interrupter I functions to supply interrupted battery to the armatures of relays 338 and 339 for a purpose which will appear presently. At the same time, battery associated with the outer upper armature of relay 216 is extended by way of the back contact and inner upper armature of relay 214 and conductor 242 to the motor start circuit indicated at 60, to cause this circuit to function and start the motor of motor generator set MG. Simultaneously, the battery on lead 242 is extended by way of the outermost contacts of contactor relay 400, resistance 401, conductor 402 and the winding of relay 243 to ground. Relay 243 operates and at its inner upper armature connects ground to the alarm circuit 244 extending to another station so as to cause an alarm signal to be manifested at that station.

During the stopped and starting period of the generator of MG, the field rheostats 414 and 415 are short-circuited so that as the motor drives the generator the voltage of the latter will build up rapidly. The short circuit is effected by the armature and back contact of relay 416. The field circuit of the generator may be traced from the negative generator terminal, back contact and armature of relay 416, field winding FW, to the positive generator terminal. When the generator voltage builds up to a value sufficient to operate relay 416 the generator field circuit includes the manually controlled rheostat 414 and the motor-driven rheostat 415.

The voltage of battery B being low, relays 312, 311, 334 and 338 will be operated and a circuit will be completed from grounded battery, outer upper armature and front contact of relay 334, armature and front contact of relay 338, conductor 350, back contact and armature of relay 251, conductor 252, normal left contacts of key 410, contact of limit switch HG, winding of relay 412, to ground by way of the back contact and inner armature of relay 413. Relay 412 operates in this circuit and connects battery and ground to the terminals of rheostat motor MR causing it to rotate rheostat arm 417 in a direction so as to reduce the resistance of rheostat 415 and to raise the voltage of the generator of motor generator set MG. When the generator voltage builds up to a value above the battery voltage, polarized relay 403 operates and causes the generator to be connected to battery B. The circuit for the operation of relay 403 is traced from the negative terminal of battery B, conductor 32, switch 431, upper winding of relay 405, winding of relay 403, negative terminal of the generator, generator positive terminal, to ground at 406 through the shunts associated with ammeter relays AR¹ and AR². Relay 403 being polarized does not operate when the generator voltage is lower than the battery voltage.

The operation of relay 403 causes relay 405 to operate in a circuit traced from the negative terminal of the generator, front contact and armature of relay 403, lower winding of relay 405, to the positive generator terminal. Relay 405, in operating its armature, causes the operation of the contactor relay 400 in a circuit traced from the positive generator terminal, armature and contact of relay 405, winding of contactor relay 400, middle back contacts of contactor 400, to the negative generator terminal. After the operation of contactor 400, the winding of relay 403 is short-circuited, relay 403 is released, and the circuit for holding contactor relay 400 operated is completed and may be traced from the negative generator terminal, resistance 407, winding of contactor 400, front contact and armature of relay 405, to the positive generator terminal. The operation of contactor 400 connects the generator of MG to battery B. This circuit is traced from the positive terminal of the generator, shunt of ammeter AR' to ground 406 which is connected to the grounded side of battary B, and from the negative terminal of the generator, front contacts of contactor 400, upper winding of relay 405, switch 431, conductor 32 to the other terminal of battery B. Since the generator voltage is higher than the battery voltage current flows from the generator to the battery B and thence to the load 389 and this current is in a direction to hold relay 405 operated. The release of relay 403 also alters the circuit for the lower winding of relay 405 by including resistance 404 therein. Under this condition relay 405 is held operated for the most part by the current through its lower winding. When the generator operates on reverse current, the direction of current in the upper winding of relay 405 is reversed causing this winding to oppose the lower winding and release relay 405 which in turn opens the circuit to relay 400.

When relay 400 operated as described above, it opened the operating circuit for relay 243 which relay releases. When relay 243 releases, a circuit is completed from grounded battery, lower armature and back contact of relay 243, lower armature and back contact of relay 254, outer lower armature and back contact of relay 211, inner upper armature and front contact of relay 250 (which relay operated on negative generator voltage over lead 408) conductor 265, winding of slow-to-operate relay 324, back contact and lower armature of relay 325 to ground. After its time-operate interval, relay 324 operates and establishes a circuit traced from grounded battery, armature and front contact of relay 324, conductor 327, front contact and outer upper armature of relay 250, normal make-before-break contacts and winding of relay 211, back contact and inner upper armature of relay 254 to ground. Relay 211 operates in this circuit.

Relay 211, operated, locks in an obvious locking circuit under control of relay 254 and, at its outer lower armature, opens the operating circuit for relay 324. At its inner upper armature, relay 211 transfers lead 210 from lead 212 to lead 260. The following circuit now exists: grounded battery, outer upper armature and front contact of relay 334, inner upper armature and front contact of relay 329, conductor 260, front contact and inner upper armature of relay 211, conductor 210, contacts 42 of key 21, normal contacts of key 43, conductor 44, contact of limit switch L, winding of relay 11, to ground at 30. Thus relay 11 functions in the manner previously described to cause rectifier X to decrease its output. As the rectifier decreases its output the battery voltage will tend to decrease and the regulation control will function to cause the motor generator set to increase its output.

When the output of rectifier X decreases to zero, battery will be connected over lead 99 to cause relay 298 to operate. This circuit may be traced from grounded battery, outer upper armature and front contact of relay 334, inner upper armature and front contact of relay 329, conductor 260, front contact and inner upper armature of relay 211, conductor 210, contact 42 of key 21, normal contacts of key 43, conductor 44, contact of limit switch L, conductor 99, winding of relay 298 to ground. Relay 298 operates and causes relay 202 to operate in a circuit from grounded battery, lower armature and front contact of relay 298, winding of relay 202, outer upper armature and back contact of relay 254, to ground at the lower armature and front contact of relay 250.

Relay 202, operated, opens the lead 204 to the rectifier and releases relay 203. The opening of lead 204 to the rectifier X deenergizes contactor relay 26 which releases its armature thus disconnecting the rectifier from the source of power 15.

When the voltage of battery B is restored to the floating range under the action of the motor generator set MG as described, relays 312, 311, 338 and 334 will release. Relay 334 released, disconnects direct battery from the armature of relays 339 and 338 leaving them connected to interrupter battery 341.

*Generator output increased*

Should the battery voltage decrease to a value outside the floating range, relay 312 of the regulator bridge circuit will operate due to the unbalanced condition of the bridge. With relay 312 operated, a circuit is established from grounded battery, outer upper armature and back contact of relay 325, armature and front contact of relay 312, contact 330 of key 331, outer lower armature and front contact of relay 329, to ground through the winding of relay 338. Relay 338 operates in this circuit.

Relay 338, operated, connects interrupted battery 341 to conductor 350, back contact and armature of relay 251, conductor 252, normal contacts of key 410, contacts of limit switch HG, winding of relay 412, to ground by way of the back contact and inner armature of relay 413. Relay 412 operated, causes the rheostat motor MR to function to rotate the rheostat arm 417 in such a direction as to cut out resistance from the motor field winding and thereby increase the generator output. When the voltage of the battery B is raised to a value within the floating range relays 312 and 338 release to disconnect interrupted battery from the generator rheostat control to prevent any further increase in the generator output.

*Generator output decreased*

Should the voltage of battery B increase to a value above the floating range, the regulator bridge circuit would be unbalanced in the opposite direction to cause relay 310 to operate which, in turn, causes the operation of relay 339. With relay 339 operated, a circuit is established extending from interrupted battery 341, armature and front contact of relay 339, conductor 262, left normal contacts of key 410', right normal contacts of key 410, limit switch LG, winding of relay 413, to ground by way of the back contact and inner armature of relay 412.

Relay 413 operates in this circuit to intermittently energize rheostat motor MR which functions to increase the resistance of rheostat 415 in the field of the generator. Thus, the generator output is decreased and the battery voltage lowered to a value within the floating range. When this value is reached relays 310 and 339 are deenergized to prevent any further decrease in the generator output.

In the event that the voltage of battery B should increase or decrease sufficiently from the floating range to cause relay 311 of the regulator bridge to operate with either relays 312 or 310, either relay 334 or 355 will operate and cause steady battery to be connected to the armatures of relays 339 and 338, thereby causing the generator to correct the battery voltage quickly. The operating circuit for relay 334 has been previously described. The operating circuit for relay 355 extends from grounded battery, outer upper armature and back contact of relay 325, armature and back contact of relay 312, winding of relay 355, front contact and armature of relay 311 to ground. It is not believed necessary to trace the circuits over which the current from the steady battery flows to control the operation of the generator rheostat since they are substantially the same as those traced for the interrupted battery.

*Transfer back to rectifier*

When the load being supplied by the motor generator set decreases to such an extent as to come within the output capacity of the rectifier, the system disclosed provides means for transferring the load to the rectifier and for stopping the motor generator set. The manner in which this feature is accomplished will now be described.

The ammeter relay $AR^2$ (Fig. 3) is connected in the main charge lead 57, the ammeter shunt 375 being shown serially included in that lead. The low contact of ammeter relay $AR^2$ is so adjusted as to operate at approximately 85 per cent of the rated output capacity of the rectifier. The ammeter relay AR associated with the rectifier is adjusted to close its high contact when the rated output capacity of the rectifier is reached. It is apparent therefore that the high contact of relay AR will be made when the rated output capacity of the rectifier is reached to initiate the transfer of the load from the rectifier to the generator, and that when the load supplied by the generator falls to such an extent as to come within the rated output capacity of the rectifier the low contact of relay $AR^2$ is made to initiate the transfer of the load from the generator to the rectifier.

As the load on the generator, which is now supplying the load, decreases, the voltage of battery B will increase to cause relays 310 and 339 to operate thereby causing the motor generator set to decrease its output in the manner previously described. When the load decreases to a value such as to come within the output capacity of the rectifier, ammeter relay $AR^2$ will operate to close its low contact 351. Ground is thus connected to the conductor 349 and thence by way of the upper winding of relay 254, front contact and inner lower armature of relay 216 to grounded battery. Relay 254 operates in this circuit and locks under control of relay 216. At its two upper armatures relay 254 causes the release of relays 202 and 211.

Relay 202 released, completes the circuit to lead 204 extending to rectifier X to cause contactor relay 26 to operate and reconnect the rectifier to the supply line L', the operating circuit for contactor relay 26 including the winding of slow-to-operate relay 324 as previously traced. When relay 324 operates, relay 203 operates as described hereinbefore.

When relay 203 operates a circuit is completed from grounded battery, inner upper armature and front contact of relay 329, conductor 260, back contact and outer upper armature of relay 211, outer lower armature and front contact of relay 203, back contact and upper armature of relay 210¹, back contact and middle lower armature of relay 200, conductor 208, normal contacts of key 35, limit switch R, winding of relay 10 to ground at 30. Relay 10 operates in this circuit to cause rectifier X to increase its output in the manner previously described.

As the rectifier output increases, the voltage of battery B will increase to cause relays 310 and 339 to operate. Each time these relays operate they will cause the motor generator set to decrease its output in the manner described hereinbefore. When it has decreased to a value where it is no longer required to carry the load ammeter relay AR¹, associated with the motor generator set, operates and connects ground to lead 419 which causes relay 217 to operate to battery and ground at the outer upper armature and front contact of relay 216.

Relay 217 operated, opens the holding circuits for relay 216 causing this relay to release and, in turn, to release relay 217. Relay 216 released, disconnects battery from lead 242 which extends to the motor generator set MG allowing the motor generator set to disconnect. It also opens the operating circuit for relay 329.

Relay 329 released connects battery to the lead 262 which causes relay 413 to operate and cause the motor-driven rheostat arm 417 to rotate to its all resistance in position, if it has not already done so.

When relay 329 releases as described, it transfers the control of relays 310 and 312 of the regulator bridge circuit from relays 339 and 338 to the leads 260 and 212 associated with the rectifier. Relay 329 also opens the circuit to interrupter relay 340 to stop the interrupter motor. Any variation in the load which produces variations in the voltage of battery B will now be reflected to relays 10 and 11 of the rectifier output control to cause the rectifier output to be varied in the manner previously described.

*Power failure*

In the event of a service failure the alternating current supply from source 15 to the rectifier and generator will be discontinued causing their outputs to reduce to zero and connect ground over the leads of the rectifier and motor generator set. At the same time, failure of the supply to transformer T4 will release relay 360, which through its armature and back contact causes relay 325 to operate in an obvious circuit. Relay 325 operated, disconnects battery from the armature of relay 312 and completes an obvious operating circuit for relay 355. Relay 355 at its inner lower armature and front contact connects ground to lead 362 which extends to the alarm circuit 242. A power failure alarm is thus operated.

Relay 325 operated, also opens the locking circuit to and releases relay 203. Relay 203 released, connects battery to lead 210 to the rectifier causing it to operate to its no-load position when power is restored.

Ground on lead 242 from the generator circuit operates relay 217 which in turn releases relays 216 and 329. Relay 329 released, connects battery to lead 262 which causes relay 413 to operate which causes the motor generator set to operate to its no-load position immediately.

Upon restoration of the power service supply battery over lead 210 from the rectifier causes the rectifier to operate to its no-load position and connects battery over lead 99 to operate relay 208. Relay 360 will reoperate and release relay 325 which, in turn, connects ground to the winding of relay 324 and battery to the armatures of relays 312 and 200. It disconnects battery from the relay 355. The rectifier will start immediately and connect to the load in the same manner as outlined hereinbefore.

*Generator false start*

In the event that the rectifier should build up to full load and a momentary drop in voltage occur on the discharge circuit, the generator would start and would not connect to the load. In order to prevent the generator operating under this condition, a false start wipe out is provided as follows:

When the rectifier reached full load the ground on lead 51 operates relay 210¹. When a momentary drop in voltage is encountered relays 311 and 312 operate and in turn operate relay 334 starting the motor generator set, as described. If the voltage corrects immediately and releases relays 311 and 312, relays 338 will not operate to increase the output of the generator. Under this condition, battery on lead 402 holds relay 243 operated. If the load now should decrease the regulator will be unable to decrease the output of the rectifier since leads 260 and 212 are opened by relay 329. This decrease in load will cause an increase in battery voltage which will cause both relays 310 and 311 to operate and in turn operate relay 355. Relay 355 operated, completes a circuit from ground through its outer lower armature and front contact, lead 365, front contact and outer upper armature of relay 243, winding of relay 217 to battery and ground at the front contact and outer upper armature of relay 216. Relay 217 operates, releasing relay 216 and restoring the circuit to normal.

*Rectifier failure*

In the event that a fuse or tube associated with the rectifier should fail the charging current reduces to a small value so that the ammeter relay would function to cause the control to function and actuate relay 10. Under this condition, the autotransformer arm 12 would be driven to the end of its travel to operate limit switch R to the left. A circuit for the operation of relay 80 is thus established. Relay 80 operated, locks independent of the limit switch R. At its right armature and front contact relay 80 establishes a circuit extending from ground, lower winding of relay 200, conductor 209, front contact and right armature of relay 80, left contact of key 20, conductors 32 and 361 to battery B. Relay 200 operates in this circuit and removes battery 201 from conductor 204 causing the release of contactor switch 26 and the consequent stopping of the rectifier. At its first lower armature and front contact relay 200 locks and brings in an alarm over the alarm circuit 244. After the circuit has been restored to normal relay 80 is released by momentarily actuating key 20.

Relay 24 has its winding connected in series with the primary winding of the rectifier plate supply transformer T1. The normal full load alternating current of the rectifier will not operate relay 24 but if the current exceeds approximately three times normal current, due to a flashover in the tubes, it operates and opens the circuit of contactor relay 26. The consequent release of relay 26 disconnects the rectier and extinguishes the flashover. As soon as the alternating current reduces to zero, relay 24 releases and its contacts reoperate relay 26 to start the rectifier.

*Regulator tube failure*

If the tube V4 should fail, the regulator bridge will be unbalanced in such a manner as to cause relays 311 and 310 to operate. Relay 310 will cause the rectifier and motor generator set to operate to their no-load position as previously described.

If the tube V3 should fail, the bridge will be unbalanced and cause both relays 311 and 312 to operate. Relay 312 causes the rectifier or motor generator set to increase its output to full load. If the trouble is not corrected before the discharge voltage increases to a predetermined high value, relay 391 will operate and cause the operation of relay 392. Relay 392 locks up under control of key 331 and connects ground to leads 393 and 394 which extend respectively to the rectifier X and motor generator set MG causing them to disconnect. When the trouble has been corrected the key 331 is operated and then restored to effect the release of relay 392.

If rectifier X is operating in the condition where it is prevented from increasing its current by the operation of ammeter relay AR, an increase in the alternating current input voltage or a decrease in the voltage of battery B will cause the rectifier current to increase even though the position of autotransformer arm 12 remains the same. In order to reduce the output current to the full load value, relay 72¹ is connected across the ammeter shunt in series with rheostat 73¹. The rheostat is adjusted so that relay 72¹ operates a flow of current of predetermined magnitude (30 amperes through the ammeter shunt which is slightly above the value at which the "high" contact of the ammeter relay closes. Relay 72¹ operated, puts ground at 30 on one side of the winding of relay 75, the other side of which being connected to battery B. Relay 75 accordingly operates and connects battery to the lead 76 between keys 21 and 43. This battery through the normal contacts of key 43 operates relay 11 thus reducing the output of the rectifier until the current through the ammeter relay shunt reaches a predetermined low value (28 amperes) and causes the release of relay 72. Relay 75 then releases and removes battery from relay 11.

What is claimed is:

1. In combination, a source of direct current comprising a motor generator set having a predetermined output capacity, a source of alternating current for driving said motor generator set, a variable direct current load having a battery associated therewith and supplied with current from said motor generator set, a rectifier having an output capacity smaller than the predetermined output capacity of said motor generator set, and means effective when the load supplied by said motor generator set decreases to a value within the output capacity of said rectifier for connecting said rectifier to said source of alternating current and to said load and for rendering said motor generator set inoperative to supply said load.

2. In combination, a source of direct current comprising a rectifier having a predetermined output capacity, a source of alternating current connected to the input terminals of said rectifier, a variable direct current load having a battery associated therewith and supplied with current from said source of alternating current by way of said rectifier, a motor generator set having an output capacity greater than the predetermined output capacity of said rectifier, and means effective when the load supplied by said rectifier exceeds the output capacity of said rectifier for automatically starting said motor generator set and causing it to be connected to said load and for disconnecting said rectifier from said alternating current source to render it ineffective to supply said load.

3. In combination, a source of direct current comprising a rectifier having a predetermined output capacity, a source of alternating current connected to the input terminals of said rectifier, a variable direct current load having a battery associated therewith and supplied with current from said source of alternating current by way of said rectifier, a motor generator set having an output capacity greater than the predetermined output capacity of said rectifier, means effective when the load supplied by said rectifier exceeds the output capacity of said rectifier for automatically starting said motor generator set and causing it to be connected to said load and for rendering said rectifier ineffective to supply said load, and other means effective when the load supplied by said motor generator set decreases to a value within the output capacity of said rectifier for causing said rectifier to reoperate and assume the load and for rendering the motor generator set ineffective to supply the load.

4. In a system of distribution, the combination of alternating current supply mains, a variable direct current load having a storage battery associated therewith, a device for converting current from said mains into direct current, said device having a predetermined output capacity, a second device for converting current from said mains into direct current, said second device having an output capacity greater than that of said first device, means for causing said first converting device to operate to supply said load, means for automatically causing said second converting device to be substituted for said first converting device when said load exceeds the output capacity of said first device, and means for automatically substituting said first converting device for said second converting device when said load again comes within the output capacity of said first device.

5. In a system of distribution, the combination of alternating current supply mains, a variable direct current load having a storage battery associated therewith, a rectifier for converting alternating current from said mains into direct current and feeding it to said load and battery, said rectifier having a predetermined output capacity, a motor generator set having an output capacity greater than that of said rectifier, a single regulating circuit adapted for use with both said rectifier and said motor generator set for regulating the outputs thereof in accordance with variations in the voltage of said battery, control means included in said regulating circuit and responsive to a decrease in battery voltage occurring subsequent to a load increase in excess of the output capacity of said rectifier for connecting said motor generator set to said alternating current supply mains and to said load, for subsequently disconnecting said rectifier from said alternating current supply mains and for causing said regulating circuit to function to vary the output of said motor generator set in accordance with variations in the voltage of said battery.

6. In a system of distribution, the combination of alternating current supply mains, a variable direct current load having a battery associated therewith, a rectifier having a predetermined output capacity connected between said mains and said load, an ammeter relay individual to said rectifier and responsive to variations in the output thereof, a regulating circuit including a bridge circuit whose galvanometer arm is devoid of current when the voltage of said battery is within predetermined limits, a relay included in the galvanometer arm of said bridge, a motor generator set having an output capacity greater than that of said rectifier, means responsive to the operation of said bridge relay after said ammeter relay functions to indicate a load in excess of the output capacity of said rectifier for causing said motor generator set to be connected to said supply mains and to said load and said rectifier to be disconnected from said supply mains, whereby said motor generator set is substituted for said rectifier in supplying said load, an ammeter relay included in the supply circuit to said load and adapted to indicate a load within the output capacity of said rectifier, and means controlled by said last-mentioned ammeter relay, when operated to indicate such a load, for reconnecting said rectifier to said supply mains and said load and for rendering said motor generator set ineffective to supply said load.

7. In a system of distribution, the combination of alternating current supply mains, a variable direct load having a storage battery associated therewith, a rectifier for converting alternating current from said mains into direct current and feeding it to said load and battery, said rectifier having a predetermined output capacity, a motor generator set having an output capacity greater than that of said rectifier, means responsive to a drop in voltage subsequent to an increase in load beyond the predetermined output capacity of said rectifier for starting said motor generator set in preparation for the substitution of said motor generator set for said rectifier in supplying said load, and means responsive to an immediate correction of the battery voltage subsequent to the increase in load beyond the predetermined output capacity of said rectifier for disabling said motor starting means whereby said motor generator set is restored to its normal condition.

8. In a system of distribution, the combination of alternating current supply mains, a variable direct current load having a storage battery associated therewith, a rectifier for supplying direct current from said mains to said load, said rectifier having a predetermined output capacity, a motor generator set having an output capacity greater than that of said rectifier, a regulating circuit adapted to regulate the output of said rectifier in accordance with variations in the voltage of said battery, control means included in said regulating circuit and effective upon the occurrence of a decrease in battery voltage subsequent to an increase in load to a value in excess of the output capacity of said rectifier for connecting said motor generator set to said alternating current supply mains to render it operative to assume the load, and means effective should the battery voltage increase immediately thereafter for disconnecting said motor generator set from said alternating current supply mains.

9. In combination, a variable direct current load having a battery connected thereacross, an alternating current supply, a rectifier interposed between said supply and said load supplying current from said supply to said load, a regulating circuit, means included in said regulating circuit and responsive to variations in the voltage of said battery caused by variations in said load for varying the input to said rectifier and thereby causing corresponding variations in the output thereof, means responsive to a load increase beyond a predetermined value for preventing any further variation in the output of said rectifier, a motor generator set, means responsive to a decrease in battery voltage subsequent to a load increase beyond a predetermined value for starting said motor generator set and for preparing the regulating circuit for operation in controlling the output of said motor generator set, means controlled by said regulating circuit for causing the voltage of said motor generator set to build up rapidly to a value in excess of that of the battery voltage, means effective when the motor generator voltage exceeds the battery voltage for causing the generator to be connected to the battery, means effective subsequent to the connection of the generator to the battery for causing the rectifier output to be decreased to zero value, means effective when the output of the rectifier reaches zero for disconnecting said rectifier from said alternating current supply, and means controlled by said regulating circuit for regulating the output of the motor generator set in accordance with variations in the voltage of the battery caused by variations in said load.

HARVEY T. LANGABEER.